P. E. HOGAN.
LISTING ATTACHMENT FOR PLOWS.
APPLICATION FILED JULY 24, 1913.
1,103,770.
Patented July 14, 1914.
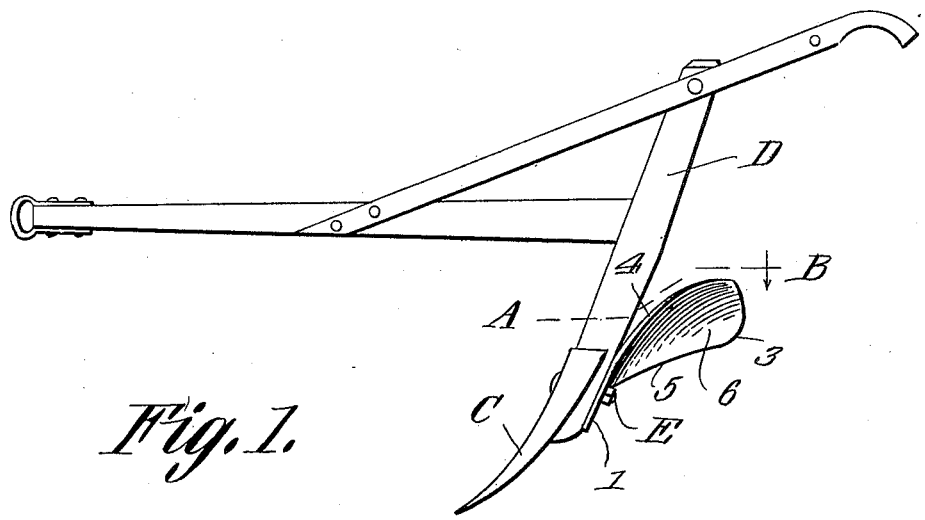
Fig. 1.
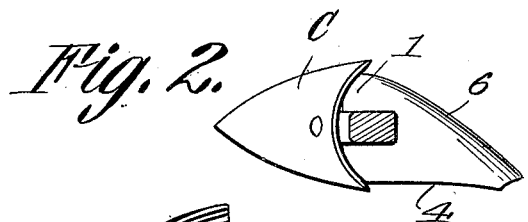
Fig. 2.
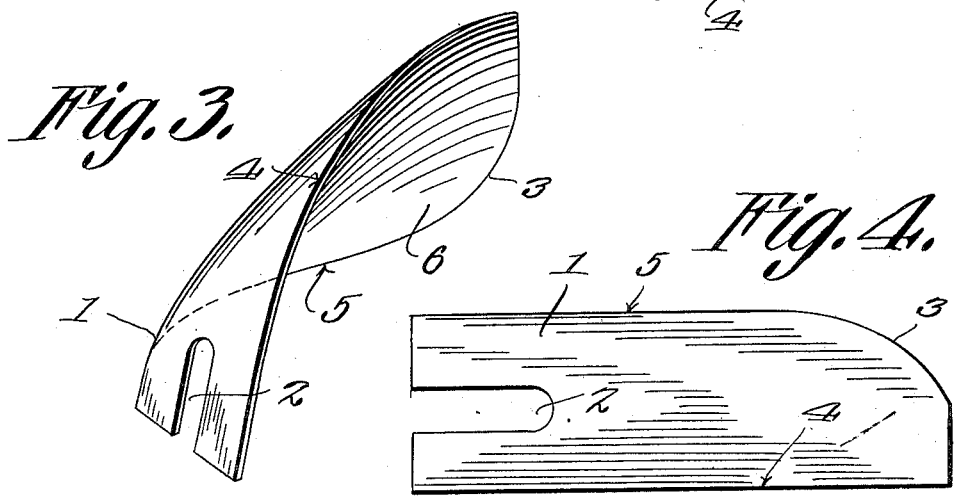
Fig. 3.
Fig. 4.
P. E. Hogan
Inventor,
by C. A. Snow & Co.
Attorneys.
Witnesses

UNITED STATES PATENT OFFICE.

PETER E. HOGAN, OF ATLANTA, TEXAS.

LISTING ATTACHMENT FOR PLOWS.

1,103,770.  Specification of Letters Patent. Patented July 14, 1914.

Application filed July 24, 1913. Serial No. 781,007.

*To all whom it may concern:*

Be it known that I, PETER E. HOGAN, a citizen of the United States, residing at Atlanta, in the county of Cass and State of Texas, have invented a new and useful Listing Attachment for Plows, of which the following is a specification.

This invention relates to a listing attachment for plows, its object being to provide a simple and efficient device of this character which can be applied readily to an ordinary cultivating plow or shovel and which will operate to throw the loosened soil laterally against the row of small plants being cultivated.

Another object is to provide an attachment of this character which is simple in construction and which can be applied readily.

With the foregoing and other objects in view, which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—Figure 1 is a side elevation of a cultivator to which the listing attachment has been applied. Fig. 2 is a section on line A—B Fig. 1. Fig. 3 is a perspective view of the listing attachment. Fig. 4 is a plan view of the blank from which the listing blade is shaped.

Referring to the figures by characters of reference 1 designates a blade of suitable thickness and of any desired material, this blade, in its original condition, being flat, as shown in Fig. 4 and provided with a slot 2 extending into one end thereof, said end being cut off at right angles to the sides. The other end of the blade has one corner rounded, as shown at 3, thus providing an elongated straight side edge 4 and a shorter straight side edge 5. In shaping the blade the same is twisted obliquely so that the rear end portion of the blade will be substantially perpendicular, whereby a curved wing 6 is thus produced which serves to collect the loosened soil directed beyond the sides of the plow to which the device is attached and to direct this loosened soil laterally against the row of plants being cultivated.

In using the device, the same is secured back of the shovel C of the cultivator, this shovel being attached in the usual manner to a standard D. If preferred the attachment can be placed back of the standard, as shown in the drawings or between the standard and the shovel. In either case the action of the attachment is the same. When the cultivator is moved forward between the rows, shovel C serves to loosen the soil and the blade following the shovel collects the loosened soil and shifts it laterally in the manner hereinbefore described, so as to form a ridge along the plants. By providing slot 2, the bolt E employed for attaching the device to the plow or cultivator can be loosened and the attachment adjusted vertically or angularly to meet the conditions under which it is used.

The device is very simple in construction, cheap to manufacture and is particularly desirable for the reason that it can be readily applied without the use of any special tools.

What is claimed is:—

The combination with a standard, a shovel bearing against the front face thereof, and an attaching bolt extending through the shovel and standard, of a listing attachment including a blade having a flat end adapted to bear against the back face of the standard, said end being formed with a longitudinal slot extending thereinto from its free end, said slot being adapted to receive the back end portion of the bolt, said blade extending upwardly above the shovel and substantially throughout the width thereof, that portion of the blade above the shovel being twisted obliquely to form a rear curved wing constituting means for deflecting laterally the soil loosened by the shovel, said blade being supported out of contact with the surface of the ground, and means engaging the rear end portion of the bolt and binding against the attachment for clamping said attachment and the shovel against opposite sides of the standard.

In testimony that I claim the foregoing as my own, I have hereto affixed my signature in the presence of two witnesses.

PETER E. HOGAN.

Witnesses:
M. H. GLASS,
J. N. HARDY.

Copies of this patent may be obtained for five cents each, by addressing the "Commissioner of Patents, Washington, D. C."